United States Patent [19]

Yamaguchi et al.

[11] Patent Number: 4,958,234
[45] Date of Patent: Sep. 18, 1990

[54] DISTORTION ELIMINATING CIRCUIT

[75] Inventors: Hirohisa Yamaguchi, Tokyo; Akira Mashimo, Tokorozawa, both of Japan

[73] Assignee: Teac Corporation, Japan

[21] Appl. No.: 259,152

[22] Filed: Oct. 18, 1988

[30] Foreign Application Priority Data

Oct. 21, 1987 [JP] Japan .................. 62-265555

[51] Int. Cl.⁵ .............................................. H04N 9/87
[52] U.S. Cl. .................................................. 358/327
[58] Field of Search ................. 455/295, 296, 302; 358/327, 328, 329, 336; 360/33.1; 369/43, 44, 54

[56] References Cited

U.S. PATENT DOCUMENTS 4,803,677  2/1989  Yamaguchi et al. .......... 369/44
4,839,615  6/1989  Sato ............................ 358/330

Primary Examiner—Donald McElheny, Jr.
Attorney, Agent, or Firm—Andrus, Sceales, Starke & Sawall

[57] ABSTRACT

A distortion eliminating circuit for eliminating a harmonic distortion from an input frequency modulated luminance signal comprises a comparator for producing a series of output pulses responsive to the input frequency modulated luminance signal by comparing the level of the frequency modulated luminance signal with a predetermined level, a filtering circuit for extracting a d.c. component from the series of output pulses by filtering out oscillating components from said output pulses, a detecting circuit for extracting a d.c. distortion component corresponding to the harmonic distortion in the input frequency modulated luminance signal by comparing the level of the d.c. component by a reference level, and a level adjusting circuit for adjusting the level of the input frequency modulated luminance signal by adding or subtracting the d.c. distortion component to the input frequency modulated luminance signal and for supplying the input frequency modulated luminance signal having a level now thus adjusted to the comparator.

9 Claims, 2 Drawing Sheets

DISTORTION ELIMINATING CIRCUIT

BACKGROUND OF THE INVENTION

The present invention generally relates to distortion eliminating circuits for eliminating distortion from signals and particularly to a circuit for eliminating a harmonic distortion from a high frequency information signal reproduced from an information recording disk.

The assignee of the present invention proposed previously in the U.S. Pat. application No. 873,407, U.S. Pat. No. 4,803,677, an information recording disk on which an information signal such as a video signal is recorded by an optical beam in a form of intermittent row of pits along a recording track and a recording and reproducing apparatus for recording and reproducing the information signal on and from such a disk by means of the optical beam. When recording a video signal on the disk, a high frequency video signal comprising a frequency converted carrier chrominance signal and a frequency modulated luminance signal is produced in the recording and reproducing apparatus, and this high frequency video signal is used to drive a laser diode. The laser diode produces a high power optical beam for recording responsive to the driving by the high frequency video signal and the recording of the high frequency video signal is made on the surface of the optical disk as a row of pits by evaporating a portion of the optical disk by the optical beam.

When to reproduce the video signal from the disk, a low power optical beam or optical probe is produced by the laser diode and the optical probe scans the surface of the optical disk. On the basis of the reflection of the optical probe from the optical disk, the high frequency video signal is reproduced, and this high frequency video signal is separated into the frequency converted carrier chrominance signal and the frequency modulated luminance signal by filtering. The frequency converted carrier chrominance signal thus reproduced is processed in a color singal reproducing circuit while the frequency modulated luminance signal is first converted into a series of rectangular pulse signals having a pulse width corresponding to the frequency of the frequency modulated luminance signal and the pulse signals thus produced are then processed in a luminance signal demodulating circuit for recovering the original luminance signal.

As described previously, the information is recorded on the surface of the optical disk by irradiating the high power optical beam so as to evaporate a portion of the optical disk. Thus, the row of pits carrying the information is formed as a result of evaporation. The row of pits defines the track on the disk and the pit has a length in the direction of the track which changes responsive to the waveform of the high frequency video signal to be recorded such that the length of the pit is long when a relatively low frequency video signal is recorded and that the length of the pit is short when a relatively high frequency video signal is recorded. Further, the row of pits is formed with such a format that a length of one pit and a separation between that pit and a neighboring pit are identical. In order to achieve such a pattern of the pits, the high frequency signal which drives the laser diode comprises a series of recording pulse signals each of which consisting of a positive pulse portion and a negative pulse portion wherein the duration of the positive pulse portion and the duration of the negative pulse portion are made identical. In the description hereinafter, a signal having such a waveform will be referred to as a signal having a 50% duty cycle. It should be noted that the duration of the each pulse signal constituting the high frequency video signal is changed but the ratio in the duration of the positive pulse portion and the negative pulse portion in each pulse signal is not changed. In other words, the duty cycle of the high frequency signal which drives the laser diode is maintained at 50%. When the high frequency video signal is reproduced on the basis of the pattern of such pits formed properly on the surface of the disk, the reproduced high frequency signal reproduced by scanning the pits by the optical beam has a sinusoidal wave form. The reproduced high frequency signal having the sinusoidal wave form is then supplied to a wave processing circuit comprising a comparator and the original high frequency video signal comprising the rectangular pulse signals is recovered.

It should be noted, on the other hand, that the length of the pit on the disk is changed responsive to the power of the optical beam. Thus, the length of the pit becomes smaller than the separation between the pits when the recording is made with an optical beam having an insufficient power and the length of the pit becomes larger than the separation between the pits when the recording is made with an optical beam having an excessive power. It should be noted that when the length of the pit and the separation between an adjacent pair of pits including the aforesaid pit in the pair is not identical, the waveform of the reproduced high frequency signal is not sinusoidal but contains a harmonic distortion. Thus, when the frequency modulated luminance signal is separated from the reproduced high frequency video singal containing the harmonic distortion, the harmonic distortion is transferred to the frequency modulated luminance signal in a form of a distortion component and such a distortion component cannot be removed even if the frequency modulated luminance signal is converted to a row of rectangular pulse signals by passing through the wave processing circuit comprising the comparator. In other words, the duty cycle of the frequency modulated luminance signal thus processed is different from 50%. Thus, when the luminance signal is recovered from the row of rectangular signals representing the frequency modulated luminance signal, the luminance signal thus obtained is not identical to the original luminance signal and there occurs a carrier leak in which a high frequency carrier produced as a result of distortion is superposed on the reproduced picture. As a result, fine stripes appear in the reproduced picture and the quality of the reproduced picture is deteriorated. Further, such a reproduced luminance signal reproduced from the frequency modulated luminance signal containing the harmonic distortion affects the operation of a non-linear emphasis circuit used in the recording and reproducing circuit for removal of the noise components and the quality of the reproduced picture is further deteriorated.

SUMMARY OF THE INVENTION

Accordingly, it is a general object of the present invention to provide a novel and useful distortion eliminating circuit for eliminating distortion form a reproduced frequency modulated signal reproduced from an optical information recording disk wherein the aforementioned problems are eliminated.

Another and more specific object of the present invention is to provide a distortion eliminating circuit comprising wave processing means supplied with an input frequency modulated signal and for producing a series of pulses on the basis of comparison of the frequency modulated signal with a reference voltage, a smoothing means for smoothing the series of pulses from the wave processing means and for obtaining a d.c. (direct current) voltage level indicating an average voltage of the pulses from the comparator means, detection means for detecting a distortion component in the frequency modulated signal and for obtaining a d.c. voltage representing the magnitude of said distortion component, and mixing means for adding said d.c. voltage corresponding to the distortion component to said reproduced frequency modulated signal so as to form a compensated frequency modulated signal having a level adjusted as a result of addition of the distortion components and for feeding the compensated frequency modulated signal back to said comparator means. According to the present invention, the level of the reproduced frequency modulated signal is shifted relative to the reference voltage used in the wave processing means so that effect of the harmonic distortion is eliminated from the series of pulses outputted from the wave processing means. Thus, a series of pulses having a duty cycle of 50% and from which the effect of the harmonic distortion is eliminated can be obtained in correspondence to the input frequency modulated signal even if the input frequency modulated signal contains the harmonic distortion.

Another object of the present invention is to provide a distortion eliminating circuit for eliminating a harmonic distortion from an input high frequency video signal comprising a frequency converted carrier chrominance signal and a frequency modulated luminance signal. According to the present invention, the effect of the harmonic distortion in the frequency modulated luminance signal is eliminated. As a result, the carrier leak on the reproduced picture is suppressed and the deteriorating effect to the non-linear deemphasis circuit used for reproduction of the luminance signal is avoided. Thus, the distortion eliminating circuit of the present invention prevents the deterioration of the quality of the reproduced picture.

Another object of the present invention is to provide a distortion eliminating circuit for eliminating a harmonic distortion from a high frequency video signal reproduced from an information recording disk on which an information is recorded by means of an optical beam in a form of a row of pits. According to the present invention, the effect of the higher order distortion caused as a result of the difference between the length of the pit and the distance between a pair of pits is eliminated and the deterioration in the quality of the reproduced picture is prevented.

Still other object of the present invention is to provide a distortion eliminating circuit comprising comparator means supplied with an input frequency modulated signal and for producing a series of pulses having a predetermined peak to peak level responsive to the result of comparison of the input frequency modulated signal with a predetermined reference voltage, smoothing means for smoothing said series of output pulses and for producing a d.c. voltage representing an average level of the series of pulses, said smoothing means comprising a first reference voltage source for producing a first reference voltage for clamping the base level of the series of pulses, a clamp circuit supplied with said first reference voltage and clamping the base level of the series of pulses outputted from the comparator means at said first reference voltage, and a low pass filter for extracting a d.c. component from output pulses outputted from the clamp circuit, and detection means for producing an output d.c. voltage corresponding to the harmonic distortion, said detection means comprising a second reference voltage source for producing a second reference voltage representing an average voltage level of pulses having a 50% duty cycle, a differential amplifier for subtracting the d.c. component from said smoothing means from said second reference voltage, and an inverter for inverting an output signal from said differential amplifier. According to the present invention, it is possible to obtain an output signal having a 50% duty cycle and from which the effect of the higher order distortion is eliminated.

Still another object of the present invention is to provide a distortion eliminating circuit comprising comparator means supplied with an input frequency modulated signal for producing a series of pulses by comparing the level of input frequency modulated signal with a predetermined threshold voltage and further for producing a series of inverted output pulses which are inversion of said series of pulses, smoothing means including a first low pass filter for smoothing the pulses from the comparator means and a second low pass filter for smoothing the inverted output pulses from the comparator means, and detection means including a differential amplifier for amplifying the difference between output signals from the first and second low pass filters and an amplifier for amplifying the output signal of the differential amplifier. According to the present invention, the number of circuits constituting the distortion eliminating circuit can be reduced.

Still other objects and further features of the present invention will become apparent from the following detailed description for preferred embodiments when read in conjunction with attached drawings.

DETAILED DESCRIPTION

Figure 1:
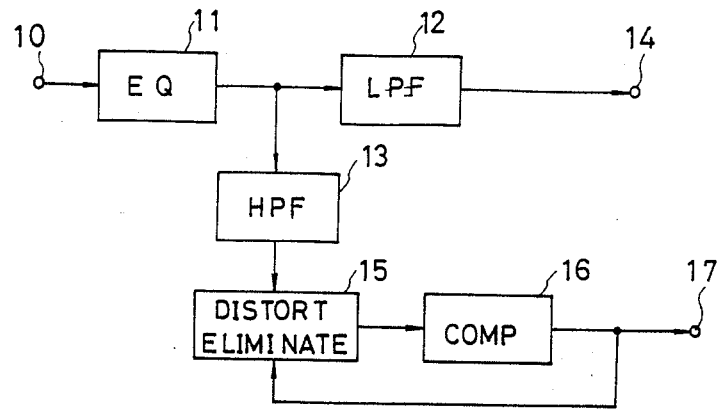
FIG. 1 is a block diagram showing a part of an information reproducing apparatus to which the distortion eliminating circuit of the present invention is applicable.

FIG. 1 shows a part of a reproducing apparatus for reproducing an information signal recorded on an information recording disk (not shown) to which the distortion eliminating circuit of the present invention is applied. Referring to the drawing, a reproduced high frequency information signal reproduced as a result of reflection of an optical beam at the surface of the information recording disk is applied to an input terminal 10. When the information signal recorded on the recording disk is a video signal, the reproduced high frequency information signal comprises a frequency converted carrier chrominance signal and a frequency modulated luminance signal. This input high frequency video signal applied to the input terminal 10 is then passed through a low pass filter 12 where a reproduced frequency converted carrier chrominance signal is obtained and to a high pass filter 13 where a reproduced frequency modulated luminance signal is separated from the input high frequency video signal. The frequency converted carrier chrominance signal obtained by the low pass filter 12 is supplied to an output terminal 14 for further processing in a color signal processor (not shown) of the reproducing apparatus. On the other hand, the frequency modulated luminance signal obtained by the high pass filter 13 is supplied to a comparator 16 after passing through the distortion eliminating circuit 15 of the present invention. The comparator 16 compares the level of the frequency modulated luminance signal supplied thereto with a predetermined threshold voltage, and produces an output pulse only when the level of the input frequency modulated luminance signal exceeds the threshold voltage. As a result, a series of pulses having a pulse width which changes responsive to the frequency of the frequency modulated luminance signal is produced in correspondence to the waveform of the frequency modulated luminance signal The pulses thus obtained is supplied to an output terminal 17 from which the pulses are supplied to a luminance signal demodulating system (not shown) of the reproducing apparatus. Further, the pulses are looped back to the distortion eliminating circuit 15 of the present invention. As will be described later, the distortion eliminating circuit 15 adjusts the overall level of the pulses looped back from the comparator 16 and produces a compensated pulses having a level adjusted such that the effect of the harmonic distortion is eliminated from the pulses obtained by the comparator 16 when the compensated pulses thus produced by the distortion eliminating circuit 15 are looped back to the comparator 16.

Figure 2:
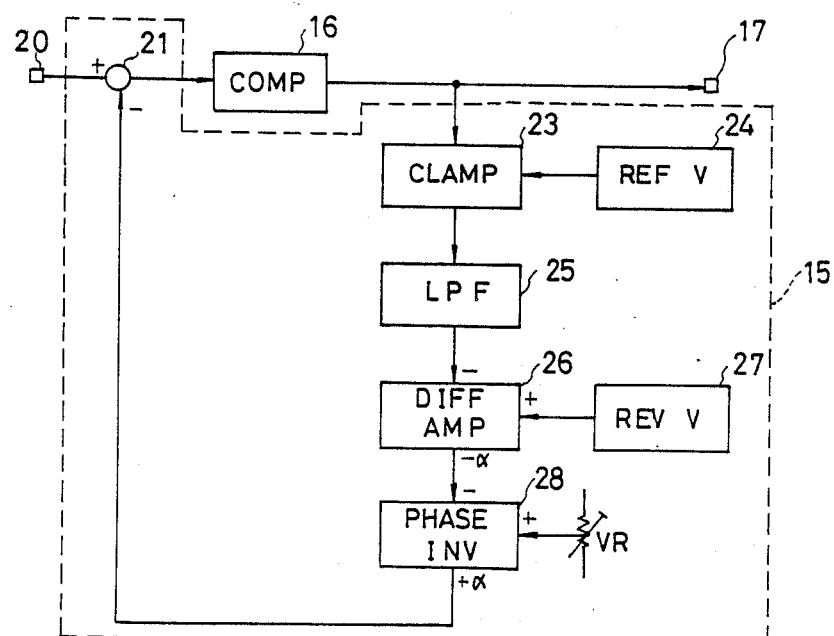
FIG. 2 is a block diagram showing a first embodiment of the distortion eliminating circuit of the present invention.

FIG. 2 is a block diagram showing a first embodiment of the distortion eliminating circuit of the present invention. Referring to the drawing, the reproduced frequency modulated luminance signal including a harmonic distortion is supplied from the low pass filter 13 to an input terminal 20. The signal is then supplied to the comparator 16 after passing through a subtractor 21. The comparator 16 compares the supplied frequency modulated luminance signal with a predetermined reference voltage $V_{TH}$ and produces a series of pulses having a peak-to-peak voltage X responsive to the portion of the waveform of the frequency modulated luminance signal having a level which exceeds said predetermined reference voltage $V_{TH}$. The pulses thus produced is supplied to the output terminal 17 on one hand and to a clamp circuit 23 on the other hand. The clamp circuit 23 adjusts the pulses such that the base level or low level state of the pulses is set to another predetermined fixed reference voltage Y which is supplied thereto from a reference voltage source 24, and supplies a series of output pulses having a base level thus fixed to the reference voltage Y. The pulses thus processed in the clamp circuit 23 is then supplied to a low pass filter 25 where a d.c. component representing the average level of the pulses is extracted from the pulses by filtering. In other words, the low pass filter 25 filters out oscillating component from the pulses. The d.c. component thus obtained has a level corresponding to the average level of the pulses, and this average level is changed depending on the duty cycle of the pulses. In other words, the d.c. component thus obtained contains a d.c. distortion component $\alpha$ corresponding to the harmonic distortion produced as a result of the deviation in the pattern of pits on the surface of the recording disk. Thus, the level of the d.c. component outputted from the low pass filter 25 is represented as $Y+X/2+\alpha$. The d.c. component obtained by the low pass filter 25 is then supplied to a differential amplifier 26 where it is subtracted from a still another predetermined reference voltage $Y+X/2$ given by a reference voltage source 27, and the d.c. distortion component $\alpha$ corresponding to the harmonic distortion is extracted from the d.c. component obtained by the low pass filter 25. It should be noted that the d.c. distortion component which is actually obtained by the subtraction is $-\alpha$ and the sign of the component is inverted. This sign of this d.c. distortion component $\alpha$ is inverted in a phase inverting amplifier 28. The phase inverting amplifier 28 further amplifies the magnitude of the d.c. distortion component $\alpha$ such that the effect of the d.c. distortion component is properly cancelled out in the processing in the circuit 15. For this purpose, the amplifier 18 is supplied with a d.c. signal for adjustment of its amplification factor from a rheostat VR. The d.c. distortion component $\alpha$ obtained by the phase inverter 28 is supplied to the subtractor 21 which is mentioned previously where it is subtracted from the frequency modulated luminance signal. Thus, the level of the reproduced frequency modulated luminance signal passed through the subtractor 21 is adjusted and the frequency modulated luminance signal thus processed is supplied to the comparator 16 again. As a result, the average level of the pulses produced by the comparator 16 responsive to the frequency modulated luminance signal thus processed is set to $Y+X/2$ and the effect of the harmonic distortion in the reproduced frequency modulated luminance signal is eliminated.

Figure 3:
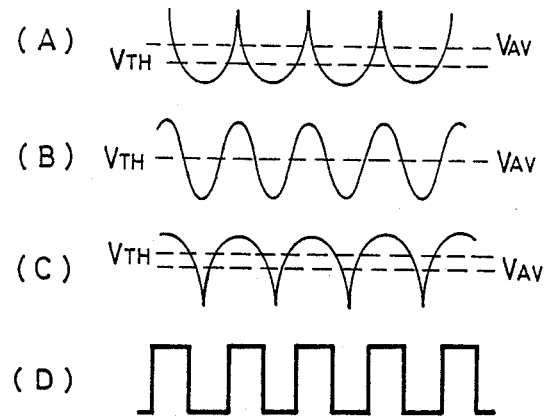
FIG. 3, consisting of (A)-(D), is a waveform chart showing signal waveforms appearing at various parts of the circuit of FIG. 2.

Next, the operation of the distortion eliminating circuit of the present invention will be described with reference to FIGS. 3(A)–(D). FIG. 3(A) shows an example of the waveform of a frequency modulated luminance signal corresponding to a pattern of pits on the disk in which the length of the pits is significantly smaller than the separation between the pits. It can be seen that the reproduced frequency modulated luminance signal contains a significant amount of harmonic distortion. The frequency modulated luminance signal in FIG. 3(A) is supplied to the comparator 16 where it is converted to the pulses by comparison of the level of the frequency modulated luminance signal with the aforementioned predetermined threshold voltage $V_{TH}$. It should be noted that the level of the voltage $V_{TH}$ is fixed. At the beginning, the level of the input frequency modulated luminance signal supplied to the comparator 16 is not adjusted by the subtractor 21. In other words, at the beginning of operation of the distortion eliminating circuit 15, the level $V_{TH}$ used in the comparator 16 is coincident to one half of the peak-to-peak level of the input frequency modulated luminance signal in correspondence to an ideal case shown in FIG. 3(B). It should be noted that the level $V_{TH}$ shown in FIG. 3(A) by a broken line is not the level $V_{TH}$ used in the comparator 16 at the beginning of operation of the distortion eliminating circuit 15 of the present invention. This one half level of the peak-to-peak level of the input frequency modulated luminance signal is indicated in FIGS. 3(A)–(C) by VAV. If the comparator 16 which is operating with the threshold level $V_{TH}$ which in turn is coincident to the level VAV is used for processing of the frequency modulated luminance signal shown in FIG. 3(A), it is obvious that the duty cycle of the obtained pulses becomes significantly smaller than 50%. As the level of the d.c. component obtained by filtering the pulses having such a low duty cycle by the low pass filter 25 is correspondingly smaller as a result of the harmonic distortion as already described, the overall level of the frequency modulated luminance signals outputted from the subtractor 21 is raised by an amount equal to the d.c. distortion component $\alpha$ by the subtractor 21, and the threshold level $V_{TH}$ is lowered relative to the VAV level of the frequency modulated luminance signal. FIG. 3(A) shows the wave form of the frequency modulated luminance signal in a state that the VAV level, and accordingly the overall level, of the frequency modulated luminance signal is raised relative to the level $V_{TH}$. When such a frequency modulated luminance signal having a raised VAV level is processed in the comparator 16 operating with the fixed threshold level $V_{TH}$ shown in FIG. 3(A), one can obtain the pulses corresponding to the frequency modulated luminance signal having a duty cycle of 50% as shown in FIG. 3(D).

FIG. 3(B) shows the ideal case in which the length of the pits and the separation between the pits are identical. In this case, the level VAV coincides with the level $V_{TH}$ and the d.c. distortion component $\alpha$ is zero. Thus, the level adjustment in the subtractor 21 is not performed. In other words, the frequency modulated luminance signal supplied to the subtractor 21 is fed to the comparator 16 as it is, and a series of pulses having the duty cycle of 50% is obtained as shown in FIG. 3(D).

FIG. 3(C) shows a case in which the length of the individual pits is smaller than the separation between the pits and the frequency modulated luminance signal supplied to the input terminal 20 has the harmonic distortion. In this case, the duty cycle of the output pulses become larger than 50% at the beginning of the operation of the distortion eliminating circuit 15. As a result of the increased duty cycle of the pulses, the level of the frequency modulated luminance signal is decreased by the subtractor 21 and the threshold level $V_{TH}$ used in the comparator 16 is raised relative to the VAV level as shown by a broken line in FIG. 3(C). As a result, the output rectangular wave has a shape as shown in FIG. 3(D) and the 50% duty cycle is achieved.

Thus, the distortion eliminating circuit 15 of the present invention produces a series of pulses responsive to the input frequency modulated luminance signal from which the effect of the harmonic distortion is eliminated. Thus, the deteriorating effect on the reproduced picture due to the carrier leak is eliminated and the quality of the reproduced picture is improved.

Figure 4:
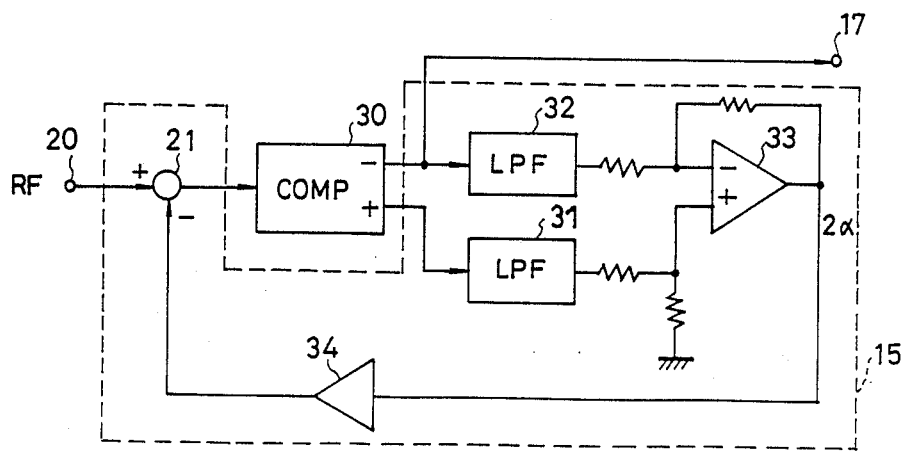
FIG. 4 is a block diagram showing a second embodiment of the distortion eliminating circuit of the present invention.

FIG. 4 shows a circuit diagram of a second embodiment of the distortion eliminating circuit of the present invention. Referring to the drawing, those parts constructed identically to those corresponding parts in FIG. 1 are given identical reference numerals and the description thereof will be omitted.

Referring to FIG. 4, a comparator 30 which is a comparator similar to the comparator 16 in FIG. 4 produces a series of pulses having a constant peak-to-peak level on the basis of comparison of the input frequency modulated luminance signal with a predetermined reference voltage $V_{TH}$. These pulses are outputted from a non-inverting output terminal (+) of the comparator 30 as it is and further outputted from an inverting output terminal (−) as inverted pulses having an inverted waveform to the waveform of the output pulses from non-inverting output terminal. The output pulses from the non-inverting output terminal of the comparator 16 and the output inverted pulses from the inverting output terminal of the comparator 16 are supplied to a non-inverting input terminal and an inverting input terminal of a differential amplifier 33 after passing through low pass filters 31 and 32. The differential amplifier 33 amplifies the difference between the d.c. average levels of the input pulses and the inverted pulses respectively supplied to the non-inverting input terminal and the inverting input terminal of the amplifier 33 and produces a d.c. output voltage having a level twice as large as the level of the d.c. distortion component $\alpha$. This d.c. output voltage is inverted in phase in an amplifier 34 and a d.c. distortion component $\alpha$ is supplied to the subtractor 21. Thus, the effect of the distortion in the frequency modulated luminance signal is removed and the output pulses having the 50% duty cycle is obtained from the terminal 17. It should be noted that the number of circuits used in the distortion eliminating circuit 15 is reduced as compared to the circuit in the first embodiment.

Further, various variations and modifications may be made without departing from the scope of the present invention.

What is claimed is:

1. A distortion eliminating circuit for eliminating a harmonic distortion from an input frequency modulated signal containing the harmonic distortion comprising:
   comparator means supplied with said input frequency modulated signal and for producing a signal of output pulses corresponding to the input frequency modulated signal containing the harmonic distortion by shaping the input frequency modulated signal on the basis of comparison with a predetermined reference voltage;
   smoothing means supplied with said output pulses from the comparator means for obtaining a d.c. output signal having a level corresponding to an average level of said output pulses by filtering the output pulses of the comparator means;
   detection means supplied with said d.c. output signal from the smoothing means and detecting a d.c. component corresponding to the harmonic distortion in said frequency modulated signal; and
   mixing means supplied with said d.c. component and further with said input frequency modulated signal for producing second frequency modulated signal having an adjusted level by mixing said d.c. component to the input frequency modulated signal and for supplying said second frequency modulated signal to said comparator means, said comparator means being supplied with said second frequency modulated signal and producing a second output pulses from which the effect of the harmonic distortion is eliminated.

2. A distortion eliminating circuit as claimed in claim 1 wherein said input frequency modulated signal comprises a high frequency video signal which in turn comprises a frequency converted carrier chrominance signal and a frequency modulated luminance signal.

3. A distortion eliminating circuit as claimed in claim 2 wherein said high frequency video signal is a high frequency signal reproduced by scanning a pattern of rows of pits on an information recording disk by an optical beam.

4. A distortion eliminating circuit as claimed in claim 1 wherein said comparator means produces a series of pulses having a predetermined peak-to-peak level.

5. A distortion eliminating circuit as claimed in claim 1 in which said smoothing means comprises a first reference voltage source for producing a predetermined first reference voltage, a clamp circuit supplied with said pulses from said comparator means and further supplied with said first reference voltage for clamping the pulses from said comparator means such that a base level of said pulses is fixed at said first reference voltage, and a first low pass filter for extracting said d.c. output signal as a d.c. component from said series of output pulses by filtering out oscillating components from said output pulses.

6. A distortion eliminating circuit as claimed in claim 1 in which said detection means comprises a second reference voltage source for producing a second reference voltage having a level corresponding to the level of a d.c. component contained in a series of pulses having a peak-to-peak level identical to the peak-to-peak level of the output pulses from said comparator means and further having a duty cycle equal to 50%, a first differential amplifier for subtracting the level of said d.c. output signal outputted from said smoothing means from said second reference voltage, and a phase inverter for inverting the phase of an output signal from said first differential amplifier and for amplifying the output signal thus inverted in phase.

7. A distortion eliminating circuit as claimed in claim 1 wherein said comparator means producing said series of output pulses by shaping said input frequency modulated signal further produces a series of inverted pulses having a phase inverted from the phase of the first mentioned pulses.

8. A distortion eliminating circuit as claimed in claim 7 wherein said smoothing means comprises a second low pass filter for smoothing said output pulses from the comparator means and a third low pass filter for smoothing said inverted output pulses from the comparator means.

9. A distortion eliminating circuit as claimed in claim 8 wherein said detection means comprises a second differential amplifier for amplifying the difference in the level between an output signal from said second low pass filter and an output signal from said third low pass filter and an amplifier for amplifying an output signal from said second differential amplifier.

* * * * *